(12) United States Patent
Biran et al.

(10) Patent No.: US 8,429,449 B2
(45) Date of Patent: Apr. 23, 2013

(54) OPTIMIZED PLACEMENT OF VIRTUAL MACHINES IN A NETWORK ENVIRONMENT

(75) Inventors: Ofer Biran, Haifa (IL); Erez Hadad, Nahariya (IL); Elliot K Kolodner, Haifa (IL); Dean H Lorenz, Haifa (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/714,552

(22) Filed: Mar. 1, 2010

(65) Prior Publication Data

US 2011/0214005 A1  Sep. 1, 2011

(51) Int. Cl.
*G06F 11/07* (2006.01)

(52) U.S. Cl.
USPC ............... 714/10; 714/3; 714/4.11; 714/4.12

(58) Field of Classification Search ............... 714/10
See application file for complete search history.

(56) References Cited

U.S. PATENT DOCUMENTS

| | | | |
|---|---|---|---|
| 2005/0251802 A1* | 11/2005 | Bozek et al. | 718/1 |
| 2006/0085785 A1* | 4/2006 | Garrett | 718/1 |
| 2006/0107084 A1* | 5/2006 | Taylor et al. | 714/1 |
| 2008/0052719 A1* | 2/2008 | Briscoe et al. | 718/104 |
| 2008/0127232 A1* | 5/2008 | Langen et al. | 719/328 |
| 2008/0163210 A1 | 7/2008 | Bowman et al. | |
| 2008/0189421 A1* | 8/2008 | Langen et al. | 709/227 |
| 2008/0189468 A1 | 8/2008 | Schmidt et al. | |
| 2008/0189700 A1 | 8/2008 | Schmidt et al. | |
| 2008/0221856 A1* | 9/2008 | Dubnicki et al. | 703/21 |
| 2009/0019158 A1* | 1/2009 | Langen et al. | 709/226 |
| 2009/0070771 A1 | 3/2009 | Yuyitung et al. | |
| 2009/0307166 A1* | 12/2009 | Routray et al. | 706/46 |
| 2009/0307334 A1* | 12/2009 | Maltz et al. | 709/219 |
| 2010/0103837 A1* | 4/2010 | Jungck et al. | 370/252 |
| 2010/0106842 A1* | 4/2010 | Cosmadopoulos et al. | 709/228 |
| 2010/0293256 A1* | 11/2010 | Machida | 709/220 |
| 2011/0029675 A1* | 2/2011 | Yeow et al. | 709/226 |
| 2011/0213753 A1* | 9/2011 | Manmohan | 707/640 |

OTHER PUBLICATIONS

Domaschka et al., "Virtual Nodes: A Re-configurable Replication Framework for Highly-Available Grid Services", Dec. 1-5, 2008, Middleware '08 Companion.*

Ian Foster et al., "Overhead Matters:A Model for Virtual Resource Management", Proceedings of the 2nd International Workshop on Virtualization Technology in Distributed Computing, 2006.

Rakeshem, "The ins and outs of host management",2007, http://blogs.technet.com/rakeshm/archive/2007/10/17/the-ins-and-outs-of-host-management.aspx.

(Continued)

*Primary Examiner* — Chae Ko
(74) *Attorney, Agent, or Firm* — F. Jason Far-Hadian; Century IP Group

(57) ABSTRACT

Systems and methods for reducing risk of service interruptions for one or more virtual machines (VMs) in a computing environment are provided. The method comprises computing a placement scheme for placing at least one VM on one or more hosts according to a set of placement constraints defined for the VM, wherein the set of placement constraints comprises at least one availability constraint defined for the VM, wherein the availability constraint designates a N resiliency level, wherein N corresponds to number of host failures that may occur before the services provided by the VM are interrupted.

9 Claims, 17 Drawing Sheets

OTHER PUBLICATIONS

"Placement . . . how do you do that voodoo?", The article pertains to Microsoft SCVMM (System Center Virtual Machine Manager). http://blogs.technet.com/rakeshm/archive/2007/11/09/placement.aspx, Nov. 9, 2007.

Brendan Cully, et al., "Remus: High Availability via Asynchronous Virtual Machine Replication", 2008, In NSDI'08: Proceedings of the 5th USENIX Symposium on Networked Systems Design and Implementation (2008), pp. 161-174.

* cited by examiner

VM Placement Constraints:
- VM X is prohibited from being collocated with VM Y
- VM Y is prohibited from being placed on host 110
- VMs X, Y, Z are to be allocated certain amounts of resources (see respective block heights)

Availability Constraints:
- VMs X, Y, Z are to be 1-resilient
- VM T is to be 2-resilient

Shadow VMs:
- SX1, SY1, and SZ1 are shadow VMs created for VMs X, Y, Z, respectively
- ST1 and ST2 are shadow VMs created for VM T

Shadow VM IDs:
- SX1, SY1, SZ1, ST1 are assigned ID values of 1
- ST2 is assigned an ID value of 2

Shadow VM placement constraints:
- ST1 is prohibited from being collocated with ST2
- SX1 is prohibited from being collocated with VM Y
- SY1 is prohibited from being placed on host 110
- SX1, SY1, SZ1, ST1, ST2 are to reserve certain amounts of particular resources (see respective block heights)

Imminent Failure on Host 110:
- Host 110 is assigned an ID value of 1
- Host 120 is designated as a migration target for VM X

Imminent Failure on Host 130:
- Host 130 is assigned an ID value of 1
- Host 120 is designated as a migration target for VM Y and VM Z

Imminent Failures on Host 110 and Host 120:
- Host 110 is assigned an ID value of 1
- Host 120 is assigned an ID value of 2
- Host 130 is designated as a migration target for VM T

Imminent Failures on Host 110 and Host 120:
- Host 120 is assigned an ID value of 1
- Host 110 is assigned an ID value of 2
- Host 110 is designated as an initial migration target for VM T

Imminent Failures on Host 110 and Host 120:
- ST1 is converted to ST2
- Host 110 is designated as a final migration target for VM T

OPTIMIZED PLACEMENT OF VIRTUAL MACHINES IN A NETWORK ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to virtual machines and, more particularly, to managing placement and availability of virtual machines in a network environment.

BACKGROUND

A host software running on a software or hardware platform or a host machine may implement a virtual machine (VM). The host software may be generally referred to as a hypervisor or a virtual machine monitor. The host software provides a platform-independent execution environment for one or more guest software applications running on the host machine. If the host software detects an imminent power failure, hardware failure, or other failure that will cause the system to become non-operational, the VM may be restarted, migrated or evacuated to another host machine.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a computer implemented method for reducing risk of service interruptions for one or more virtual machines (VMs) in a computing environment. The method comprises computing a placement scheme for placing at least one VM on one or more hosts according to a set of placement constraints defined for the VM, wherein the set of placement constraints comprises at least one availability constraint defined for the VM, wherein the availability constraint designates a N resiliency level, wherein N corresponds to number of host failures that may occur before the services provided by the VM are interrupted.

In an exemplary embodiment, a computer-implemented method for managing virtual machines (VMs) in a network environment, comprises creating one or more shadow VMs for each VM and creating for each shadow VM a set of additional constraints wherein the shadow VMs and the associated additional constraints are utilized to protect the VMs against a certain number of host failures as indicated by an availability constraint, and wherein the shadow VMs and associated constraints are used to reach a placement scheme which does not infringe the availability constraints, associating a placement scheme with one or more VMs on one or more hosts according to a set of placement constraints defined for the VMs and a set of placement constraints defined for the shadow VMs, wherein the placement scheme satisfies a set of availability constraints defined for the VMs and the shadow VMs, wherein a first availability constraint indicates that a first VM is to be protected against a certain number of host failures.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
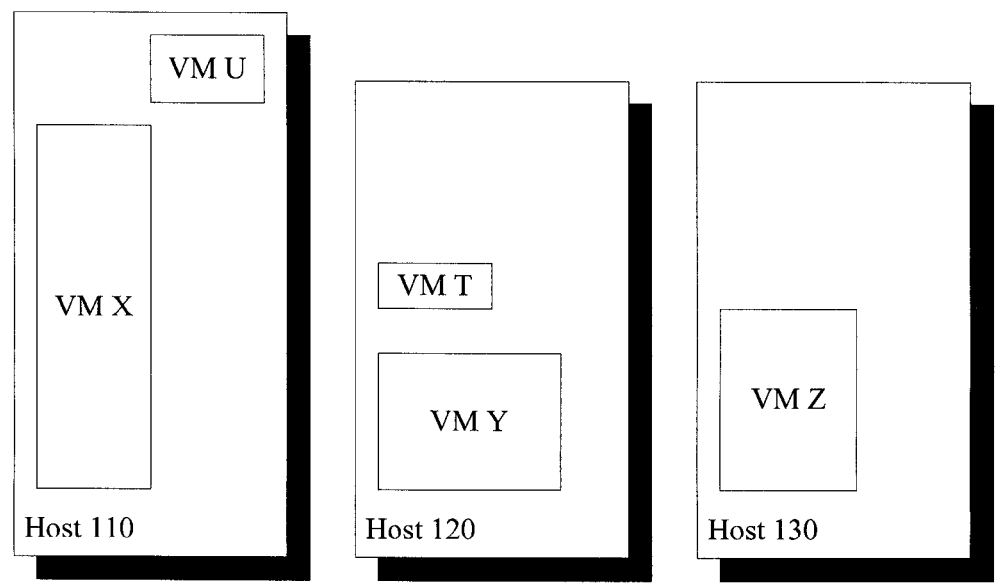
FIG. 1 illustrates an exemplary network environment, in accordance with one or more embodiments.

Referring to FIG. 1, in accordance with one or more embodiments, exemplary network environment 100 comprises one or more hosts (e.g., hosts 110, 120, 130) and one or more VMs (e.g., VMs X, Y, Z, T, U). A migration manager (not shown) may manage placement and availability of the VMs. In one embodiment, the migration manager may utilize a placement engine to compute an initial placement of the VMs on the hosts according to a set of placement constraints defined for the VMs. The placement engine may be configured as a constraint satisfaction problem (CSP) solver that utilizes first-order logic (i.e., computations) to compute a placement of a set of VMs on a set of hosts according to a set of placement constraints.

The placement constraints may comprise one or more anti-collocation constraints, anti-location constraints, resource constraints, or other constraints relevant to placement of the VMs on the hosts. An anti-collocation constraint may prohibit a VM from being placed on the same host as another VM (i.e., avoid a first and second VM from being collocated on the same host). An anti-location constraint may prohibit a VM from being placed on a certain host. A resource constraint may indicate that a certain level of a particular resource is to be allocated to a VM. Please note that in the following the terms migration and evacuation with respect to a VM may be used synonymously to mean that a VM executing on a first host is moved to a second host and has terminated execution on the first host.

In one embodiment, the migration manager (or evacuation manager) may also ensure that the VMs continue to execute (i.e., are available) despite failure of one or more hosts. That is, the VMs may be protected against at least a certain number of host failures according to one or more factors (e.g., availability constraints, hereafter also sometimes referred to as resiliency level). An availability constraint may indicate the maximum number of host failures against which a VM is protected. For example, an availability constraint may indicate that a VM is N-resilient (e.g., is associated with an N resiliency level), where N indicates the number of available host to the VM for migration. In other words, a VM is N-resilient if the VM may be migrated to N other hosts in case of failure of the host on which it resides. Depending on implementation, a plurality of VMs may be protected against a common number of host failures or each VM may be protected against a number of host failures designated for the particular host.

In any case of an initial placement not satisfying all requirements (for instance in case new VMs have to be deployed, or in case some constraints on the VMs have been modified) for each VM which is associated with availability constraints one or more evacuation spaces (hereafter referred to as shadow VMs) are created and additional placement constraints relevant to placement of the shadow VMs are defined. As used herein, a shadow VM refers to a logical computing object that is utilized to ensure that an associated VM is protected against the number of host failures as required by an availability constraint defined for the VM. In one implementation, a shadow VM may also be utilized to reserve resources for a VM on a host that is not currently executing the VM. Resources reserved for a VM on a host may be reserved by other shadow VMs placed on the host until the VM is migrated to the host. Also, depending on implementation, the amount of reserved resources may be the same or different from the amount of resources currently allocated to the VM.

Upon creating the shadow VMs and defining the additional placement constraints, the migration manager may utilize a placement engine to compute a new placement for the VMs on the hosts. That includes placement of the shadow VMs on the hosts according to the placement constraints defined for the shadow VMs. In one embodiment, the placement engine may be configured as a CSP solver that utilizes first-order logic and computations to determine placement of a set of VMs and placement of a set of shadow VMs on a set of hosts according to a set of placement constraints defined for the VMs and a set of placement constraints defined for the shadow VMs, respectively.

The new placement desirably satisfies the set of placement constraints defined for the VMs and the set of placement constraints defined for the shadow VMs. The new placement may also be utilized to designate migration targets and patterns for the VMs if failure of one or more hosts is detected. In one embodiment, the VM migration may be limited to VMs executing on the failing hosts. A host on which a shadow VM is placed may be designated as a migration target for an associated VM, as provided in further detail below.

Referring to FIGS. 2A, 2B, and 3A through 3K, in accordance with one embodiment, the migration manager may utilize a placement engine to compute a placement of VMs X, Y, Z, T, U on hosts 110, 120, 130 according to a set of placement constraints defined for the VMs. Referring to FIG. 3A, for example, an anti-collocation constraint may prohibit VM X from being collocated with VM Y, an anti-location constraint may prohibit VM Y from being placed on host 110, and the resource capacity of host 110 may be greater than the resource capacities of hosts 120 and 130 such that host 110 is able to satisfy the resource constraints of VM X and VM U but host 120 and host 130 are unable to do. In such a scenario, the placement manager may place VM X and VM U on host 110, VM Y and VM T on host 120, and VM Z on host 130, as shown. It is noteworthy that exemplary FIGS. 3A through 3K illustrate resource capacities and constraints in relation to the block height illustrated for each resource.

Figure 2A:
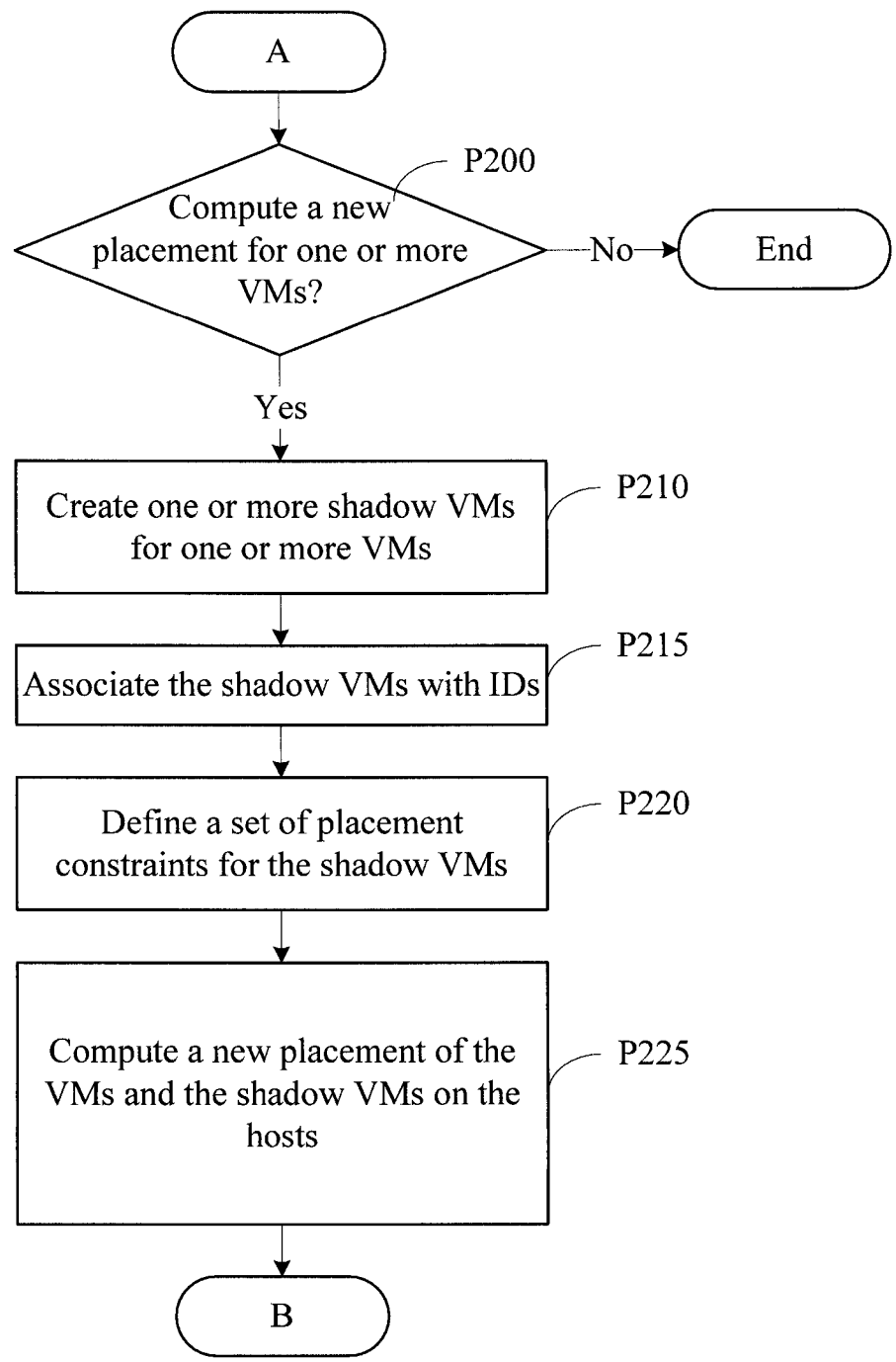
FIGS. 2A and 2B are flow diagrams of a method for managing placement and availability of one or more VMs, in accordance with one embodiment.
Figure 3A:
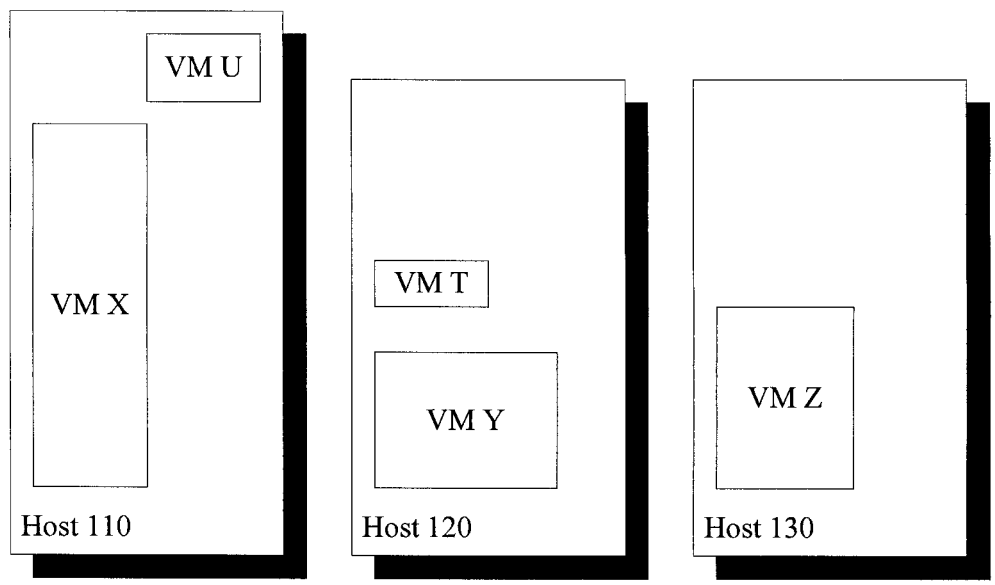
FIGS. 3A through 3L illustrate managing placement and availability of one or more VMs, in accordance with one or more embodiments.

Referring to FIG. 2A, in one embodiment, the migration manager may determine whether a new placement for one or more VMs is needed (P200). A new placement may be computed for different reasons. For example, new VMs that are not currently placed may need to be deployed, or some currently placed VMs may need to be removed. As another example, a new placement may be needed to conform to constraints that have been modified. For instance, the system administrator may desire for VM X to be anti-collocated with VM T in contrast to the initial placement constraints (e.g., including modification of the resiliency constraints which may be dynamically set). A new placement may be also desired if the resources effectively used by the VMs that are time dependent cause a system (e.g., a cluster of computing systems) to be unbalanced. For example, some host may have a low load while some others may be overloaded. Thus, a newly computed placement may ease the load at the overloaded hosts by, for example, relocating part of their VMs or resources towards under-loaded hosts.

Figure 3B:
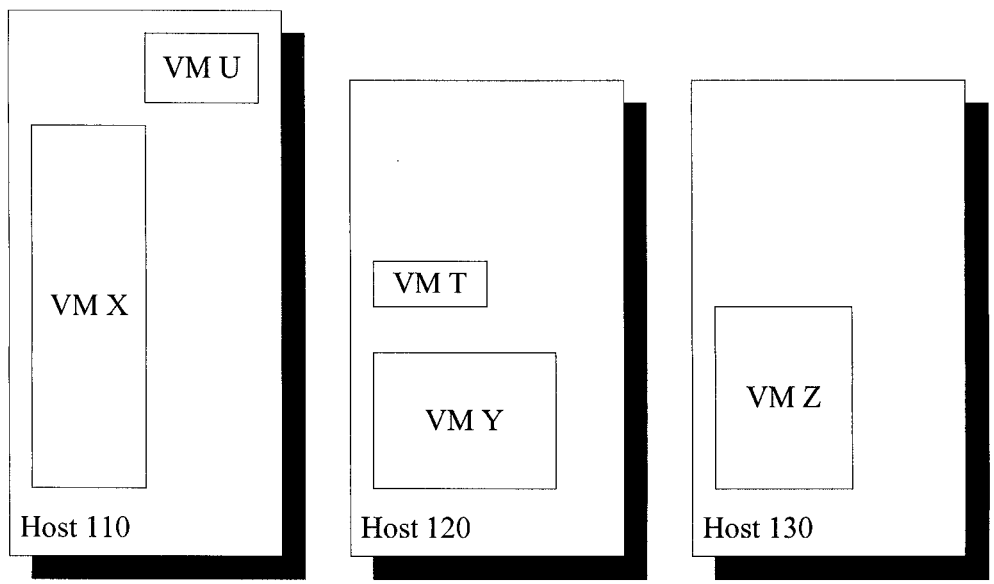

In one embodiment, when a new placement for one or more VMs is to be computed, the migration manager creates one or more shadow VMs for one or more VMs (P210). Desirably, for each resilient VM, one or more shadow VMs is created. It is noteworthy that the number of shadow VMs created for a VM may be based on the availability constraint, if any, defined for the VM. In one implementation, N shadow VMs may be created for a VM that is required to be N-resilient. Referring to FIG. 3B, for example, availability constraints may require VM X, VM Y, and VM Z to be 1-resilient and VM T to be 2-resilient. No availability constraint may be defined for VM U. In such a scenario, the placement of the VMs on the hosts cannot satisfy the availability constraint requiring VM X to be 1-resilient without violating at least one of the placement constraints defined for VM X, as shown.

Figure 3C:
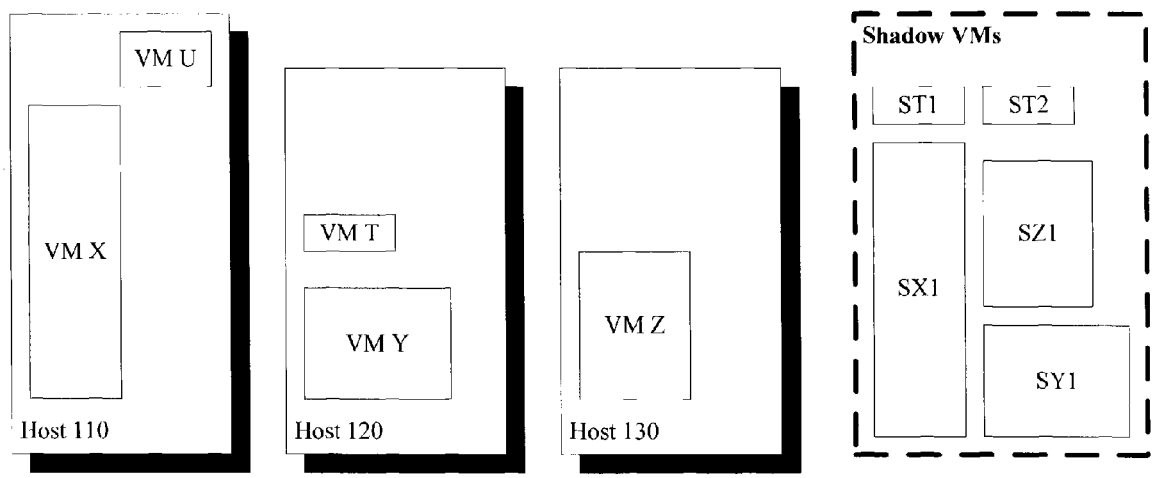

In one implementation, if failure or imminent failure of host 110 (i.e., VM X's current host) is detected, VM X cannot be migrated to another host in the network environment 100 without violating the anti-collocation constraint prohibiting VM X from being collocated with VM Y or the resource constraint indicating that VM X is to be allocated a certain amount of particular resources. VM X cannot be migrated to host 120 on which VM Y is placed, and VM X cannot be migrated to host 130 because has insufficient resources to support VM X in addition to VM Y and VM T. Referring to FIG. 3C, for example, shadow VM SX1 may be created for VM X; shadow VM SY1 may be created for VM Y; shadow VM SZ1 may be created for VM Z; and shadow VM ST1 and shadow VM ST2 may be created for VM T.

Figure 3D:
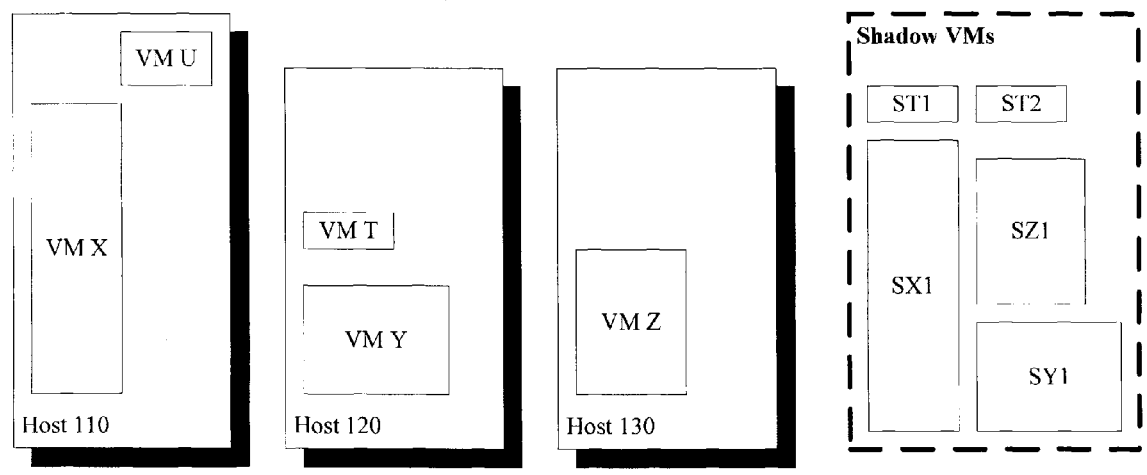

Referring back to FIG. 2A, upon creating the shadow VMs for the VMs, the migration manager associates the shadow VMs with one or more identifiers (IDs) (P215). In one implementation, ID values for a set of shadow VMs created for a VM may range from 1 to n, where N denotes the total number of shadow VMs created for the VM. Referring to FIG. 3D, for example, shadow VM SX1 and shadow VM SY1 may be assigned an ID value of 1, and shadow VM ST1 and shadow VM ST2 may be assigned ID values of 1 and 2, respectively.

Upon associating the shadow VMs with the IDs, the migration manager defines a set of placement constraints for the shadow VMs (P220). For purposes of illustration, let VM (x, i) denote a shadow VM configured for VM x, where VM x denotes the VM for which the shadow VM is created and i denotes the ID associated with the shadow VM. Let P (h, x) denote the placement of VM x on host h such that P (h, x)=1 if VM x is placed on host h and P (h, x)=0 otherwise. Let R (x, d) denote the amount of resource type d to be allocated to VM x. And, let C (h, d) denote the capacity of host h with respect to resource type d.

In one implementation, an anti-collocation constraint is defined to prohibit shadow VM (x, i) from being collocated with VM x, and another anti-collocation constraint is defined to prohibit shadow VM (x, i) from being collocated with VM (x, j), for a VM x and i not equal to j. That is, shadow VMs configured for the same VM are prohibited from being collocated with each other as well as with the VM which they are protecting. Also, if an anti-location constraint prohibits VM x from being placed on host h, a corresponding anti-location constraint is defined to prohibit VM (x, i) from being placed on host h, for any i. If an anti-collocation constraint prohibits VM x from being collocated with VM y, a corresponding constraint is defined to prohibit VM (x, i) from being collocated with VM y and VM (y, j), for any i not equal to j.

In one exemplary implementation, for any resource type d and any host h, $\text{sum}_x (P(h,x)*R(x,d))+\text{sum}_j (\max_{h'\neq h}\{\text{sum}_{y,i} (P(h,y,j)*P(h',y)*R(y,d)+P(h,y,j)*P(h',y,i)*R(y,d))\})$ is prohibited from being greater than C (h, d) (P310d). h' refers to any host that is different from h; sum refers to the amount of resources to be allocated to VM x on h; $\text{sum}_j$ refers to the amount of resources to be allocated to shadow VMs on h; $\max_{h'\neq h}$ refers to the maximum amount of resources to be allocated to any VM on any h'; and $\text{sum}_{y,i}$ refers to the amount of resources to be allocated to the shadow VMs on h.'

Figure 3E:
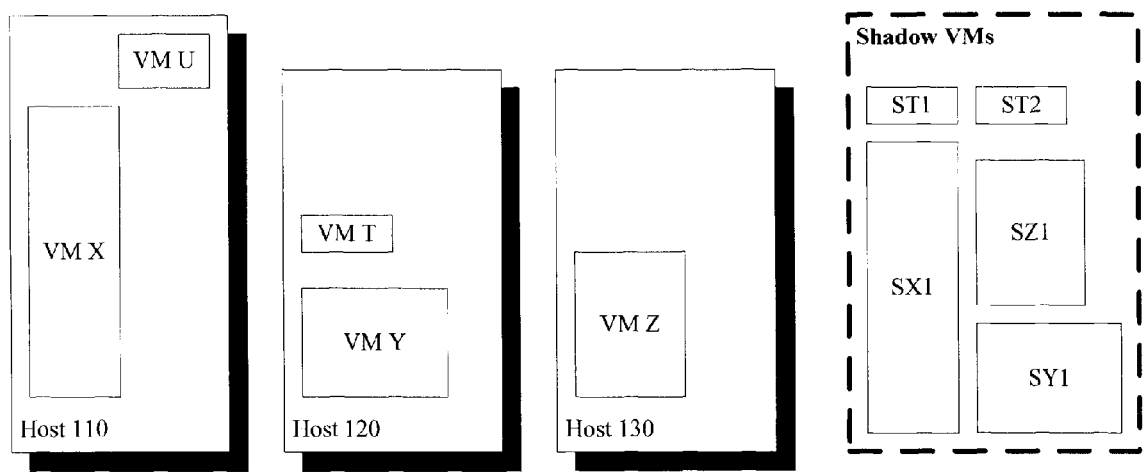

Referring to FIG. 3E, for example, an anti-collocation constraint may be defined to prohibit shadow VM ST1 from being collocated with shadow VM ST2. Also, since an anti-collocation constraint prohibits VM X from being placed on the same host as VM Y, corresponding anti-collocation constraints may be defined to prohibit shadow VM SX1 from being collocated with VM Y. Since an anti-location constraint prohibits VM Y from being placed on host 110, a corresponding anti-location constraint may be defined to prohibit shadow VM SY1 from being placed on host 110. And, since resource constraints indicate certain amounts of particular resources to be allocated to VMs X, Y, Z, T, corresponding resource constraints may be defined for shadow VMs SX1, SY1, SYZ, ST1, ST2 to reserve the resources for their associated VMs.

Figure 3F:
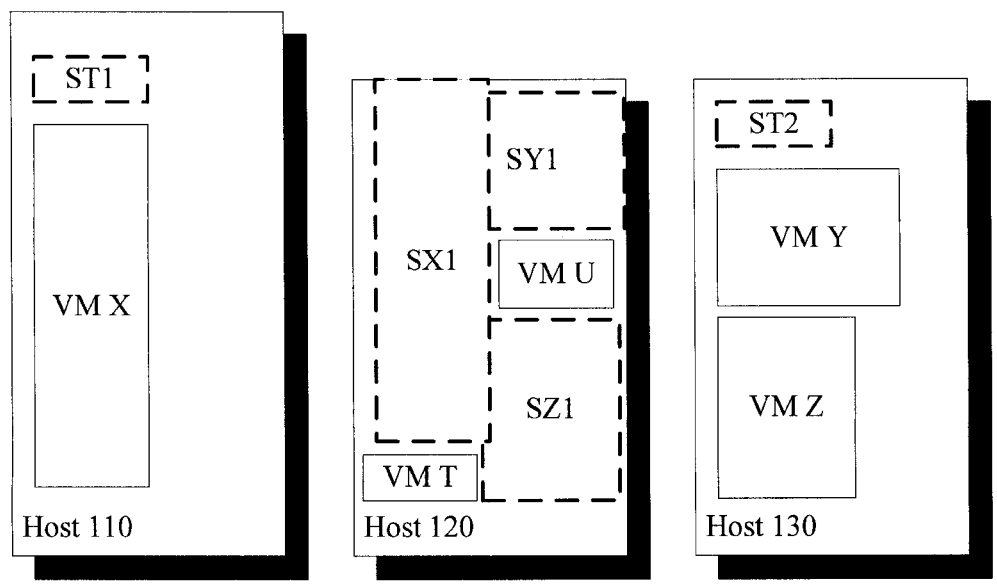

Referring back to FIG. 2A, upon defining the placement constraints for the shadow VMs, the migration manager utilizes a placement engine to compute a new placement for the VMs on the hosts according to the placement constraints defined for the VMs and the placement constraints defined for the shadow VMs, if possible (P225). Referring to FIG. 3F, for example, the placement manager may place VM X and shadow VM ST1 on host 110; VM T, VM U, shadow VM SX1, shadow VM SY1, and shadow VM SZ1 on host 120; and VM Y, VM Z, and shadow VM ST2 on host 130, as shown. It is noteworthy that shadow VM SX1 may be collocated with shadow VM SY1 because their respective ID values are the same. Further, shadow VMs SX1, SY1, and SZ1 may reserve the same resources as illustrated by overlapping of their respective blocks.

Figure 2B:
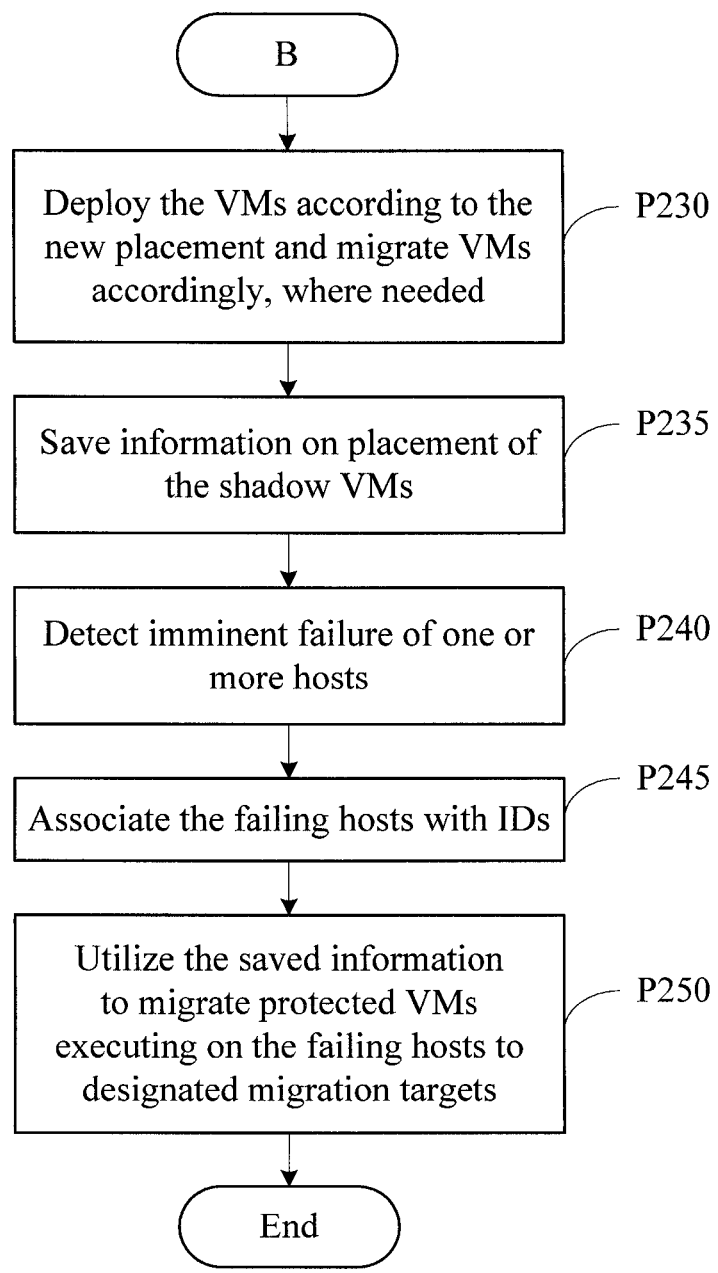
Figure 3G:
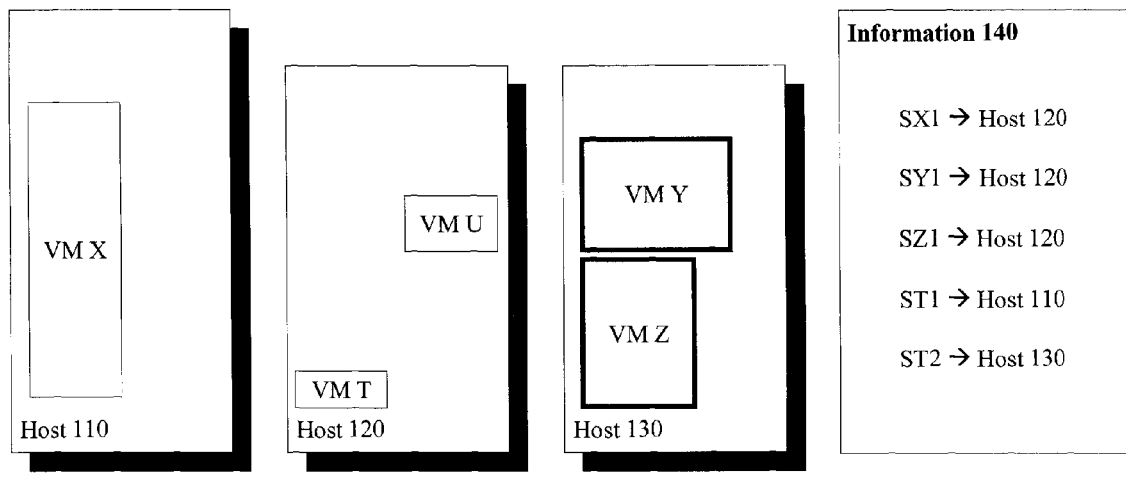

Referring to FIG. 2B, in one embodiment, the migration manager may deploy the VM according to the newly calculated placement. Such deployment includes migrating VMs that are placed on different hosts according to the new placement (P230). The migration manager also saves information 140, which associates each shadow VM with a host according to the new placement (P235). Referring to FIG. 3G, for example, VM Y may be migrated from host 120 to host 130, and VM U may be migrated from host 110 to host 120. Also, information 140 may associate shadow VMs SX1, SY1, and SZ1 with host 120; shadow VM ST1 with host 110; and shadow VM ST2 with host 130. It is noteworthy that the hosts may have no knowledge of the shadow VMs, and the shadow VMs are not deployed on the hosts.

Depending on implementation, at some point in time, the migration manager may concurrently detect imminent failure of one or more hosts and associate the failing hosts with IDs (P240, P245). In one example, each of the failing hosts is assigned an ID value ranging from 1 to n, where N denotes the total number of failing hosts. Upon assigning the ID values, the migration manager utilizes information 140 to migrate protected VMs executing on the failing hosts to designated migration targets, as provided in further detail below (P250).

As provided earlier, a VM may be protected against a certain number of host failures indicated by an availability constraint defined for the VM. Thus, there is at least one migration target available for the VM if the number of host failures against which the VM is protected is greater than or equal to the number of failing hosts. For purposes of illustration, let VM (x, i) denote a shadow VM created for VM x, where VM x denotes a protected VM for which the shadow VM is created and i denotes the ID associated with the shadow VM; and let host h (j) denote a failing host that is assigned ID value j.

In one exemplary implementation, the migration manager designates the host on which VM (x, j) is placed as a migration target for any VM x placed on host h (j). The migration manager also converts VM (x, i) to VM (x, j), for any VM (x, i) placed on host h (j). That is, the migration manager exchanges the IDs between VM (x, i) and VM (x, j). If i is less than j, the migration manager updates the migration target for VM x. Once the migration targets are designated for the protected VMs executing on the failing hosts, the migration manager migrates the protected VMs to their respective migration targets.

Figure 3H:
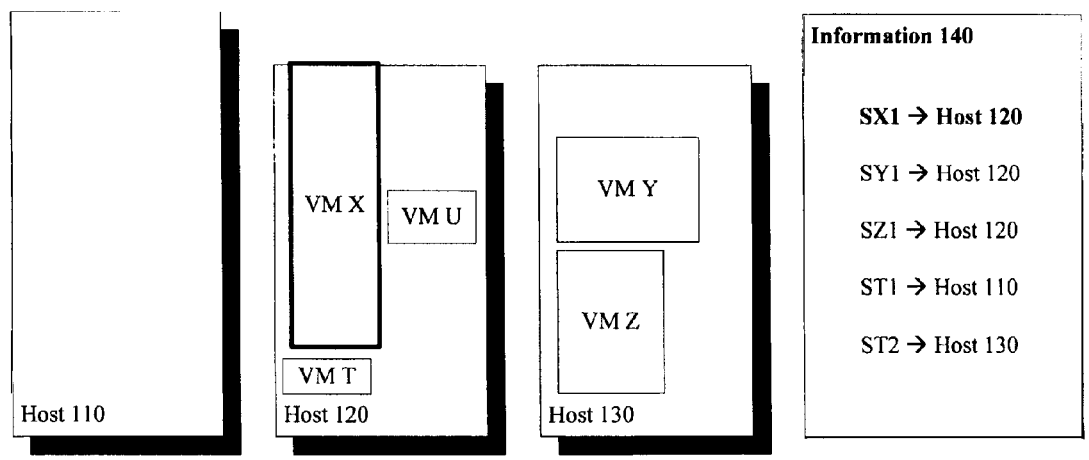

In one exemplary scenario, an imminent failure may be detected on host 110. Referring to FIG. 3H, in accordance with one embodiment, the migration manager assigns an ID value of 1 to host 110 and utilizes information 140 to migrate VM X from failing host 110 to host 120. Host 120 is designated as the migration target for VM X because information 140 associates shadow VM SX1, which is assigned the same ID value as failing host 110, with host 120.

Figure 3I:
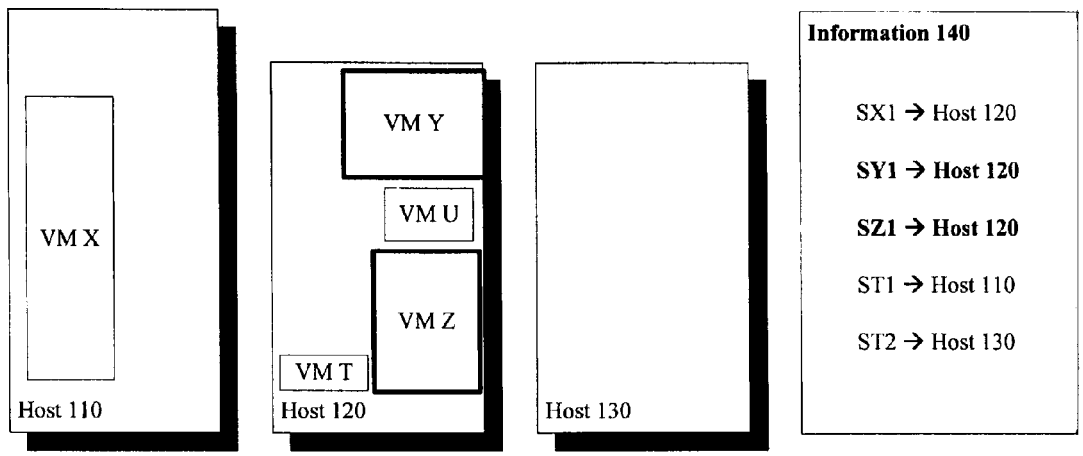

In another exemplary scenario, an imminent failure may be detected on host 130. Referring to FIG. 3I, in accordance with one embodiment, the migration manager assigns an ID value of 1 to host 130 and utilizes information 140 to migrate VM Y and VM Z from failing host 130 to host 120. Host 120 is designated as the migration target for both VM Y and VM Z because information 140 associates shadow VM SY1 and shadow VM SZ1, which are assigned the same ID value as failing host 130, with host 120.

Figure 3J:
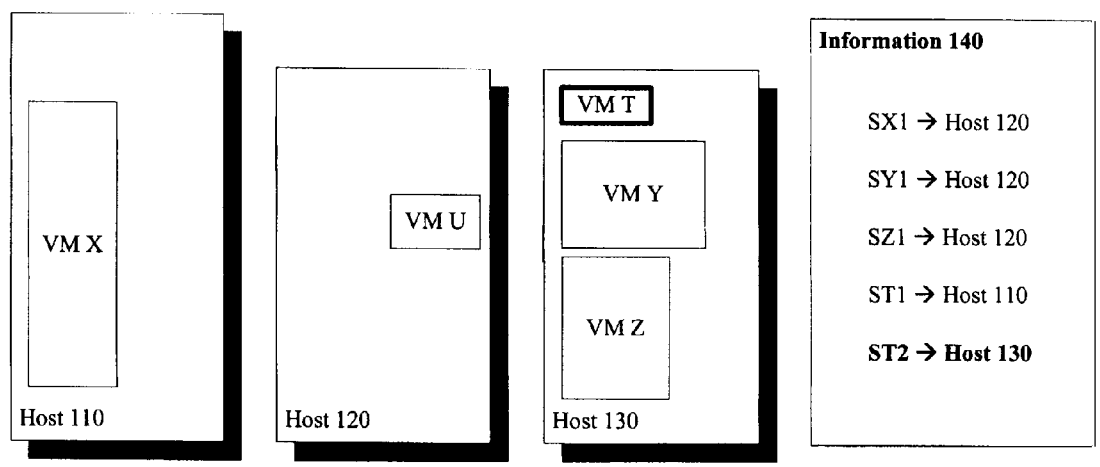

In yet another exemplary scenario, imminent failures may be concurrently detected on host 110 and host 120. Referring to FIG. 3J, in accordance with one embodiment, the migration manager assigns ID values of 1 and 2 to host 110 and host 120, respectively, for example, and utilizes information 140 to migrate VM T from host 120 to host 130. Host 130 is designated as the migration target for VM T because information 140 associates shadow VM ST2, which is assigned the same ID value as failing host 120, with host 130. It is noteworthy that VM X and VM U are not migrated because VM X and VM U are 1-resilient, and the number of failing hosts is greater than 1. That is, VM X and VM U are not protected against more than one host failure.

Figure 3K:
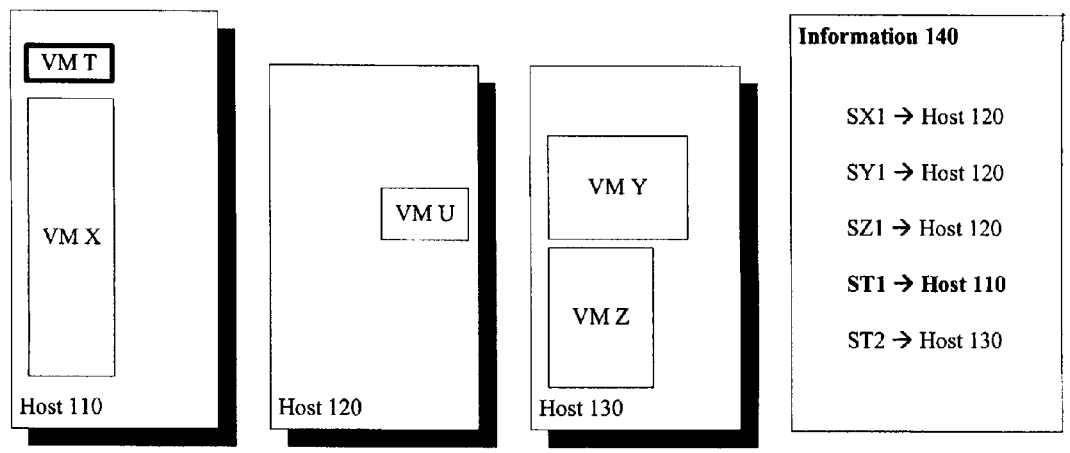
Figure 3L:
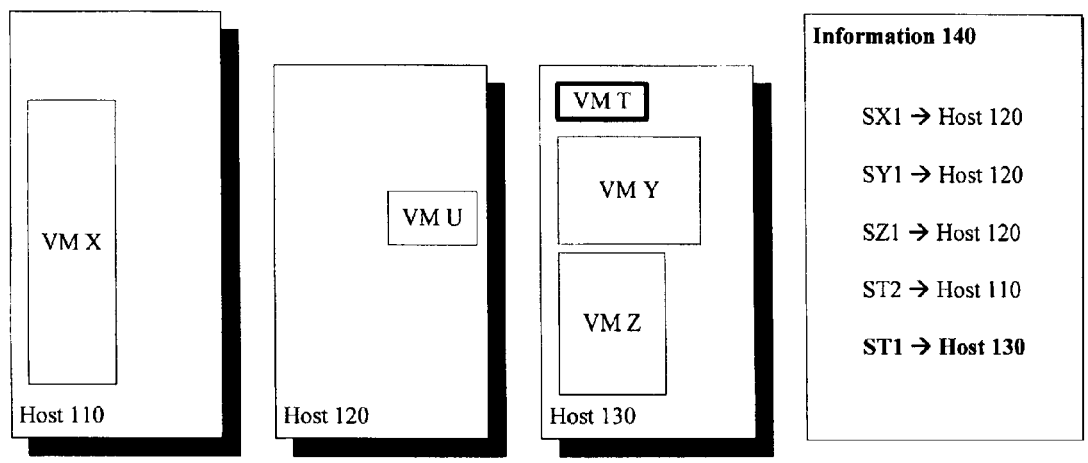

In an alternative example, the migration manager assigns ID values of, for example, 1 and 2 to host 120 and host 110, respectively. Referring to FIGS. 3K and 3L, in accordance with one embodiment, host 120 is initially designated as the migration target for VM T because information 140 associates shadow VM ST1, which is assigned the same ID value as failing host 120, with host 110, as shown in FIG. 3K. Then, since host 110 is also failing, the migration manager converts shadow VM ST1 to shadow VM ST2 and changes the migration target for VM T to host 130, as shown in FIG. 3L.

In accordance to one or more implementations, the amount of time required to migrate a protected VM upon detecting imminent failure of one or more hosts is minimized. Since the migration manager, in one embodiment, utilizes previously saved information about the placement of shadow VMs to designate a migration target for the VM, advantageously, the migration manager is not required to dynamically determine a new placement upon detecting imminent failure of one or more hosts. Furthermore, in one embodiment (e.g., in a stand-by method), some hosts are reserved for use as backup. In other words, where the cluster as a whole may have a considerable amount of spare resources, the cluster may not be able to utilize these resources for the benefit of the deployed VMs (e.g., to improve performance by allocating more resources) if the proper placement is not calculated.

The above noted schemes allow for distributing the spare resources as shadow VMs that reside on a plurality of hosts together with real VMs. Since the shadow VMs do not consume the resources of the cluster, those resources may be allocated as additional available resources. That is, a reserve of resources may be allocated beyond the minimum allocation associated with the real VMs. When a real VM is migrated or evacuated to its shadow, the other real VMs in the same host as the shadow may release resources back to the shadow, but not beyond their reserve capacity. The flexibility associated with maintaining a reserve of resources helps reduce the number of relocations or failures that are caused by increasing resource requirements. Furthermore, stand-by hosts are a valid solution of the proposed constraints. If, for example, a system administrator desires, a cluster may rely on stand-by hosts.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
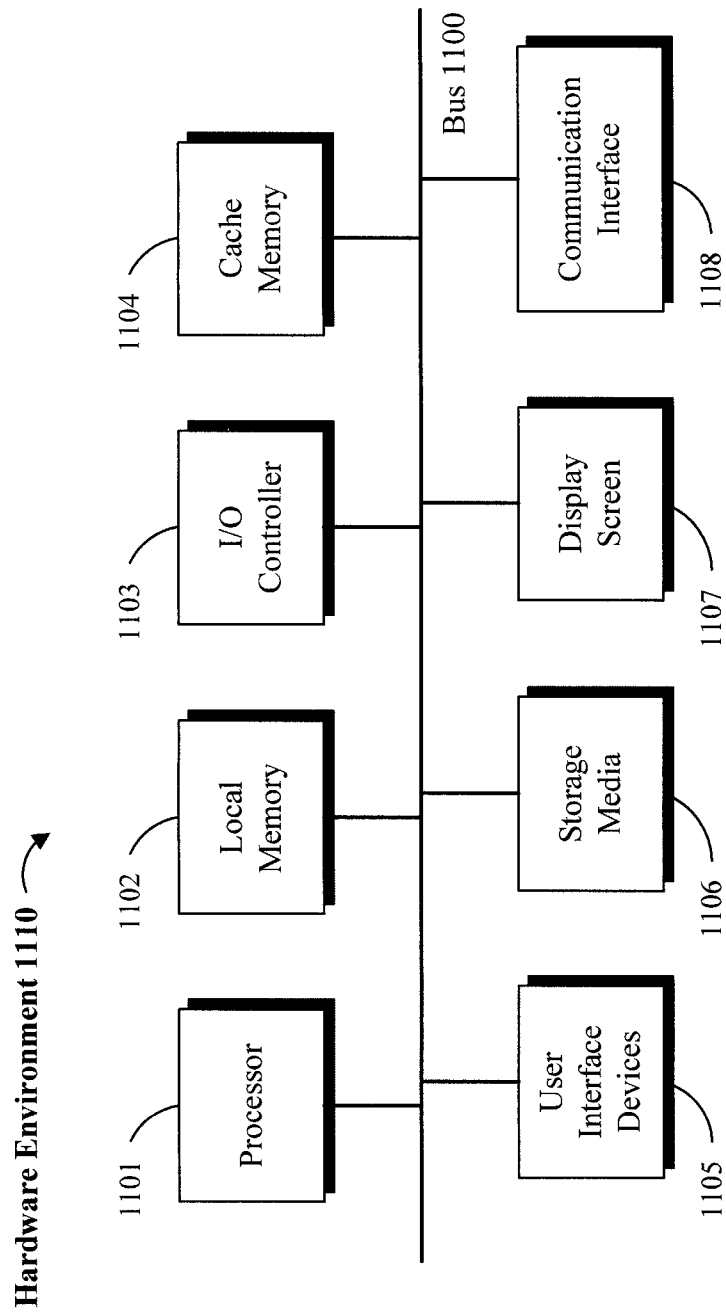
FIGS. 4A and 4B are block diagrams of hardware and software environments in which the disclosed systems and methods may operate, in accordance with one or more embodiments.
Figure 4B:
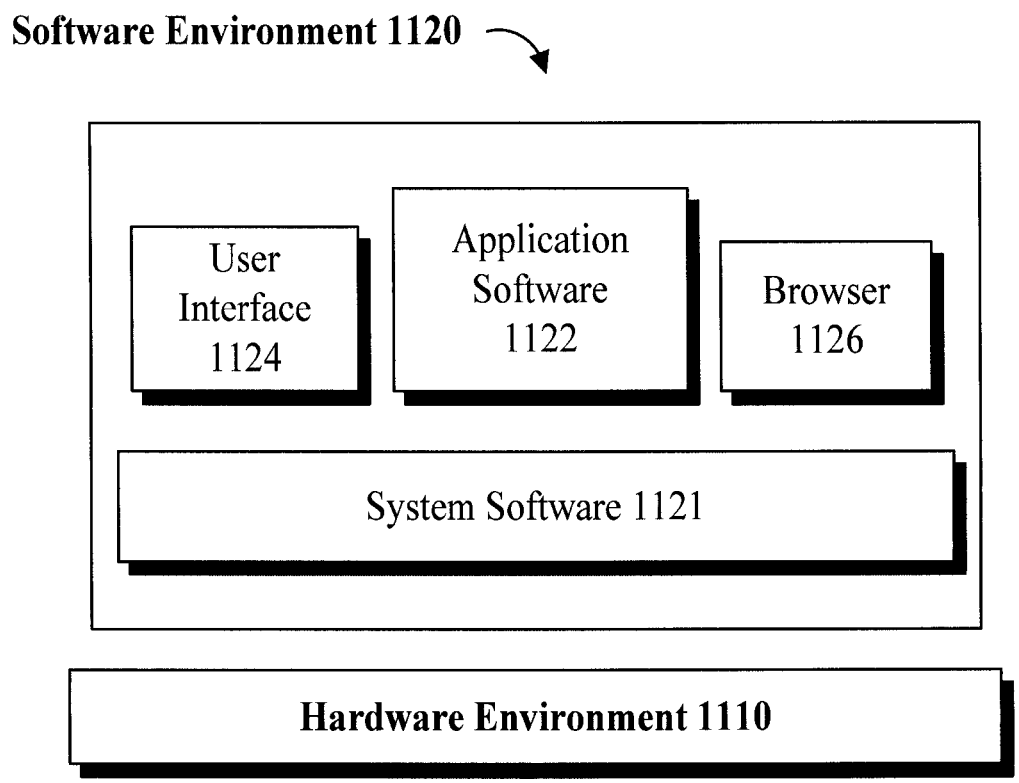

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semi-conductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for reducing risk of service interruptions for one or more virtual machines (VMs) in a computing environment, the method comprising:

computing a placement scheme for placing at least one VM on one or more hosts according to a set of placement constraints defined for the VM, wherein the set of placement constraints comprises at least one availability constraint defined for the VM, wherein the availability constraint designates a N resiliency level, wherein N corresponds to number of host failures that may occur before the services provided by the VM are interrupted, evacuating the VM from a first host to a second host in a computing environment, in response to determining that the first host pertains to a group of up to N hosts susceptible to failure, wherein said VM is placed on first host in accordance to the placement constraints, wherein said VM can be placed on a second host also in accordance to the placement constraints, wherein N is the designated N resiliency level for said VM, further comprising pre-allocating shadow VMs for the VM to minimize risk of service interruption for said VM due to failure of one or more hosts hosting the VM wherein:

h denotes a group of hosts;

VM(x) denotes a VM x;

P(h,x) denotes placement of x on h; such that P(h,x)=1 if x is placed on h and P(h,x)=O;

Otherwise:

R(x,d) denotes resource requirement of VM(x) for a resource type d;

C(h,d) denotes the capacity on host h of resource type d;

the method further comprising, for each VM, adding a set of F shadow VMs:

{VM(x,1), VM(x,2) . . . , VM(x,F)}; wherein F is the number of host failures from which the VM is protected;

wherein:

VM(x,O) denotes an original VM(x)

A j-shadow is a shadow of the form VM(x,j) for any x

P(h,x,j)=1 if shadow VM(x,j) is placed on h the method further comprising constructing evacuation mapping in case of host failures by:

numbering each failed host from 1 to F;

for j=1 to F performing the following:

(a) for x on host hG) setting evacuation target of x to the host containing the shadow VM(x,j);

(b) for shadow VM(x,i) on host hG) doing the following:

1. converting shadow VM(x,j) to VM(x,i); and 2. if i<j then updating the evacuation target of x;

the method further comprising constructing additional constraint rules by:

for any VM x and any i!=j, set VM(x,i) as anti-collocated with VM(x,j), wherein: i,j may be 0;

if VM(x) and VM(y) are anti-collocated then set VM(x,i) as anti-collocated with VM(y,j) for any i!=j. If VM(x) is anti-located with host h, then also VM(x,i) is anti-located with host h, for any i;

for any resource type d and any host h, sumx (P (h,x)*R(x, d))+sum$_j$(max$_{h'=h}${sum$_{y,i}$(P(h,y,j)*P(h',y)*R(y,d)+ P(h,y,j)*P (h',y,i)*R (y,d))}) is prohibited from being greater than C(h, d) (P310d) h' refers to any host that is different from h; sum$_x$ refers to the amount of resources to be allocated to VM x on h; sum$_j$ refers to the amount of resources to be allocated to shadow VMs on h; max$_{h'=h}$ refers to the maximum amount of resources to be allocated to any VM on any h'; and sum$_{y,i}$ refers to the amount of resources to be allocated to the shadow VMs on h'
subject to:
setting rule 1 such that 2 shadows of the same VM are not placed on the same host;
setting rule 2 such that anti-collocation and anti-location apply to shadows, wherein a case i=j for anti-collocation is excluded, such that anti-collocated VMs have a different failed host number during evacuation;
setting rule 3 as the resource capacity constraints such that:
a left sum is the resource used for the real VMs on h,
a right sum is the resource used for the shadows,
shadows with different failure numbers (the sum over j) do not overlap;
for each failure number j, summing the worst case host failure (both the shadows VM(y,j) on h corresponding to VM(y) on h', and the shadows VM(y,j) that have a 'brother' shadow VM(y,i) (for any i) on host h' to guarantee space on h both for the VMs of h' (when h' will be assigned as j) and for VMs of other hosts that have a shadow on h' and a j-shadow on h, and due the Convert (in case h' fails) will also be routed to their j-shadow;
wherein due to rule 1, P(h,y,j) is 1 for at most one j on host h, so that all sets of J hosts are not maximized, wherein two different failure numberings cause evacuation of disjoint sets of VMs to the host h.

2. A computer-implemented method for managing virtual machines (VMs) in a network environment, the method comprising:
creating one or more shadow VMs for each VM and creating for each shadow VM a set of additional constraints wherein the shadow VMs and the associated additional constraints are utilized to protect the VMs against a certain number of host failures as indicated by an availability constraint, and wherein the shadow VMs and associated constraints are used to reach a placement scheme which does not infringe the availability constraints,
associating a placement scheme with one or more VMs on one or more hosts according to a set of placement constraints defined for the VMs and a set of placement constraints defined for the shadow VMs, wherein the placement scheme satisfies a set of availability constraints defined for the VMs and the shadow VMs, wherein a first availability constraint indicates that a first VM is to be protected against a certain number of host failures, and
deploying the VMs according to the placement scheme, wherein deploying the VMs comprises migrating any VMs that are placed on different hosts,
further comprising saving information about placement of the shadow VMs, wherein the saved information is utilized to designate migration targets for the VMs,
further comprising detecting imminent failure of one or more of the hosts, wherein a first VM is deployed on a first failing host,
further comprising determining whether number of failing hosts is less than or equal to the certain number of host failures against which the first VM is protected,
further comprising utilizing the saved information to designate a migration target for the first VM, in response to determining that the number of failing hosts is less than or equal to the certain number of host failures against which the first VM is protected,
further comprising associating the shadow VMs with a first set of identifiers, wherein identifier values in the first set of identifiers range from 1 to total number of shadow VMs,
further comprising associating the failing hosts with a second set of identifiers, wherein identifier values in the second set of identifiers range from 1 to total number of failing hosts,
wherein an identifier value assigned to a first shadow VM is same as an identifier value assigned to the first failing host.

3. The method of claim 2, further comprising designating a host on which the first shadow VM is placed as the migration target.

4. The method of claim 3, further comprising:
converting the first shadow VM to a second shadow VM if the host on which the first shadow is placed is a failing host; and
designating a host on which the second shadow VM is placed as the migration target.

5. The method of claim 4, wherein the set of placement constraints defined for the shadow VMs comprises an anti-collocation constraint prohibiting shadow VMs created for the first VM from being collocated with each other.

6. The method of claim 4, wherein the set of placement constraints defined for the shadow VMs comprises an anti-collocation constraint prohibiting shadow VMs created for the first VM from being collocated with a second VM, if the first set of placement constraints comprises an anti-collocation constraint prohibiting the first VM from being collocated with the second VM.

7. The method of claim 4, wherein the set of placement constraints defined for the shadow VMs comprises an anti-location constraint prohibiting a shadow VM created for the first VM from being placed on a certain host, if the first set of placement constraints comprises an anti-location constraint prohibiting the first VM from being placed on that host.

8. The method of claim 4, wherein the set of placement constraints defined for the shadow VMs comprises a resource constraint that prohibits sum of total amount of a particular resource allocated to protected VMs on a host and total amount of the particular resource reserved by shadow VMs on the host from being greater than the capacity of the host with respect to the particular resource.

9. A computer implemented method for reducing risk of service interruptions for one or more virtual machines (VMs) in a computing environment, the method comprising:
computing a placement scheme for placing at least one VM on one or more hosts according to a set of placement constraints defined for the VM, wherein the set of placement constraints comprises at least one availability constraint defined for the VM, wherein the availability constraint designates a N resiliency level, wherein N corresponds to number of host failures that may occur before the services provided by the VM are interrupted,
h denotes a group of hosts;
VM(x) denotes a VM x;
P(h,x) denotes placement of x on h; such that P(h,x)=1 if x is placed on h and P(h,x)=0;
Otherwise:
R(x,d) denotes resource requirement of VM(x) for a resource type d;
C(h,d) denotes the capacity on host h of resource type d;
the method further comprising, for each VM, adding a set of F shadow VMs:
{VM(x,1), VM(x,2) . . . , VM(x,F)}; wherein F is the number of host failures from which the VM is protected;

wherein:

VM(x,0) denotes an original VM(x)

A j-shadow is a shadow of the form VM(x,j) for any x

P(h,x,j)=1 if shadow VM(x,j) is placed on h the method further comprising constructing evacuation mapping in case of host failures by:
  numbering each failed host from 1 to F;
  for j=1 to F performing the following:
(c) for x on host h(j) setting evacuation target of x to the host containing the shadow VM(x,j);
(d) for shadow VM(x,i) on host h(j) doing the following:
  1. converting shadow VM(x,j) to VM(x,i); and
  2. if i<j then updating the evacuation target of x;
the method further comprising constructing additional constraint rules by:
for any VM x and any i!=j, set VM(x,i) as anti-collocated with VM(x,j), wherein: i,j may be 0;
if VM(x) and VM(y) are anti-collocated then set VM(x,i) as anti-collocated with VM(y,j) for any i!=j If VM(x) is anti-located with host h, then also VM(x,i) is anti-located with host h, for any i;
for any resource type d and any host h, sumx (P (h,x)*R (x,d))+$sum_j$($max_{h'!=h}${$sum_{y,i}$(P(h,y,j)*P(h',y)*R(y,d)+P(h,y,j)*P(h',y,i)*R(y,d))}) is prohibited from being greater than C(h, d) (P310d) h' refers to any host that is different from h; $sum_x$ refers to the amount of resources to be allocated to VM x on h; $sum_j$ refers to the amount of resources to be allocated to shadow VMs on h; $max_{h'!=h}$ refers to the maximum amount of resources to be allocated to any VM on any h'; and $sum_{y,i}$ refers to the amount of resources to be allocated to the shadow VMs on h' subject to:

setting rule 1 such that 2 shadows of the same VM are not placed on the same host;

setting rule 2 such that anti-collocation and anti-location apply to shadows, wherein a case i=j for anti-collocation is excluded, such that anti-collocated VMs have a different failed host number during evacuation;

setting rule 3 as the resource capacity constraints such that:
a left sum is the resource used for the real VMs on h,
a right sum is the resource used for the shadows,
shadows with different failure numbers (the sum over j) do not overlap;

for each failure number j, summing the worst case host failure (both the shadows VM(y,j) on h corresponding to VM(y) on h', and the shadows VM(y,j) that have a 'brother' shadow VM(y,i) (for any i) on host h' to guarantee space on h both for the VMs of h' (when h' will be assigned as j) and for VMs of other hosts that have a shadow on h' and a j-shadow on h, and due the Convert (in case h' fails) will also be routed to their j-shadow;

wherein due to rule 1, P(h,y,j) is 1 for at most one j on host h, so that all sets of J hosts are not maximized, wherein two different failure numberings cause evacuation of disjoint sets of VMs to the host h.

\* \* \* \* \*